United States Patent [19]

Shields

[11] 3,711,579
[45] Jan. 16, 1973

[54] METHYL 2-HYDROXYETHYL METHYL (METHYLOL) PHOSPHINATES AND PROCESS FOR THEIR PRODUCTION

[75] Inventor: Theodore Curtis Shields, South Charleston, W. Va.

[73] Assignee: Union Carbide Corporation, New York, N.Y.

[22] Filed: Oct. 30, 1970

[21] Appl. No.: 85,774

[52] U.S. Cl..........260/953, 260/309.7, 260/448.8 R, 260/971, 117/136
[51] Int. Cl. ............................C07f 9/32, D06c 27/00
[58] Field of Search..............................260/953, 971

[56] References Cited

UNITED STATES PATENTS 3,005,020  10/1961  Buckler ...........................260/953 X Primary Examiner—Lewis Gotts
Assistant Examiner—Anton H. Sutto
Attorney—Paul A. Rose, Aldo John Cozzi and Clement J. Vicari

[57] ABSTRACT

Novel compounds of the present invention represented by the following structural formula.

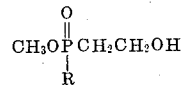

wherein R is methyl or hydroxymethyl. The process for their preparation is also included. The novel compounds of the present invention are useful in imparting flame retardancy to fibrous materials.

8 Claims, No Drawings

METHYL 2-HYDROXYETHYL METHYL (METHYLOL) PHOSPHINATES AND PROCESS FOR THEIR PRODUCTION

This invention relates to novel phosphorus containing compounds. More particularly the invention relates to the novel compounds, i.e., methyl 2-hydroxyethylmethylphosphinate and methyl 2-hydroxyethylmethylolphosphinate and to the process for their production.

The novel compounds of the present invention may be represented by the following structural formula.

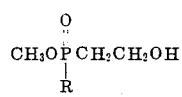

wherein R is methyl or hydroxymethyl. The novel compounds are useful in imparting flame retardancy to a wide host of fibrous materials.

In general, the novel compounds of the present invention may be produced by reacting elemental phosphorus with an alcohol, preferably methanol, and ethylene oxide in the presence of a basic catalyst, preferably N,N-dimethylethanolamine to produce thereby an organophosphorus composition. This portion of the process is carried out by contacting the reactants in a suitable reaction vessel. The order of addition is not critical. The reaction temperature can vary widely, for instance, elevated temperatures of from about 25°C. to about 200°C. are suitable, and temperatures of from about 44°C. (the melting point of phosphorus) to about 150°C. are preferred. The reaction is carried out for a period of time sufficient to produce an organophosphorus composition. For instance, reaction times of from about 10 minutes to about 10 hours are suitable, depending upon temperature and the like. If desired, an inert organic diluent can be employed for the reaction. Suitable diluents include toluene, methyl isobutyl ketone, dioxane, dimethyl-sulfoxide, and the like. It is usually desirable to blanket the reaction mixture with an inert atmosphere such as nitrogen. The organophosphorus compositions produced thereby are thereafter reacted with an aldehyde, preferably formaldehyde, in order to convert substantially all of the phosphinous hydrogen (i.e., hydrogen bonded directly to phosphorus) to hydroxymethyl. The formaldehyde addition reaction is carried out simply by adding the formaldehyde to the organophosphorus compositions and contacting until substantially all of the phosphinous hydrogen has been converted to hydroxymethyl groups in accordance with the reaction:

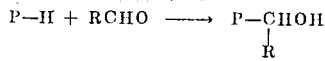

wherein R represents hydrogen or an aliphatic or aromatic group.

This reaction, which is usually exothermic, will take place at room temperature, although higher or lower temperatures can be employed if desired. At room temperature, the aldehyde addition reaction usually takes place from about 0.1 to 6 hours, after which the product can be recovered by vacuum evaporation of excess aldehyde. The aldehyde is preferably employed in proportions slightly in excess of the amount needed to react with all of the phosphinous hydrogen.

The above procedure is described in detail in the application of Chisung Wu, Ser. No. 886,037 filed Dec. 17, 1969 now U.S. Pat. No. 3,644,595 and assigned to a common assignee and is incorporated herein by reference.

To the reaction product produced according to the above described procedure there is added an amount of a solvent such as methanol, ethanol or ethylene glycol (hereinafter called "primary solvent") the addition being accompanied by agitation and the quantity, being sufficient to enhance the fluidity of the reaction products resulting from the above described procedure. This step is followed by addition of another, less-polar solvent such as diethyl ether, dioxane, diglyme, glyme, and the like resulting in precipitation of an insoluble, higher molecular weight material. The proportions of solvents may be varied at will. With increasing amounts of primary solvent in the first step decreasing precipitation of high molecular weight materials occurs; with increasing amounts on non-polar cosolvents increasing precipitation occurs.

As a general rule, there can be employed in the first step an amount of primary solvent within the range of 5 to 30 parts per hundred parts of phosphorus reaction product by weight. The amount of solvent in the first step to the amount employed in the second can vary from about 7 to 15 parts by weight co-solvent to primary solvent by weight. An optimum procedure involves addition of sixty ml. dry methanol to 100 g. of colorless viscous liquid followed by addition of about 400 ml. diethyl ether. There are generally two phases which form an upper phase and a lower phase. The upper phase is separated and the solvent removed by vacuum at a temperature below about 60°C. Other techniques for removing the solvent are well known in the art and hence no detailed description of procedures is deemed necessary. The residue, i.e., the product remaining after solvent removal is thereafter introduced into a vessel, equipped with agitating means, reflux-condenser, and entry ports for the introduction of nitrogen. To the vessel there is also introduced a compound such as N,O-bis-trimethylsilylacetamide, trimethylsilylimidazole and N,O-bis-trimethylsilyltriflouroacetamide, which compound is normally added over a period of from about 2 to 60 minutes. Nitrogen is continually introduced to the medium. The medium is agitated for about 2 to 30 minutes.

The product material, i.e., the trimethylsilylated derivatives of the novel compounds may then be vacuum flash distilled to separate it from acetamide and residue tars if desired. Separation of the trimethylsilylated derivatives of the novel compounds can thereafter be accomplished by preparative vapor-liquid chromatography on a boiling point column such as silicone gum rubber at column temperatures between about 60°C. and 250°C. Precautions must be taken to exclude moisture from the exit port, if the trimethylsilylated derivatives are to remain unhydrolyzed. If the novel compounds themselves are desired it is convenient to permit hydrolysis in air since spontaneous hydrolysis at the exit port results in transformation to the original phosphorous alcohols contained in the product mixture. The alcohols are collected in cold traps while trimethylsilanol, the other hydrolysate fraction, escapes as a volatile gas.

As mentioned previously the novel compounds of the present invention have utility as flame retardants for a wide variety of fibrous materials. The treatment to impart flame retardancy to fibrous material may be applied to any fibrous material containing primarily cellulosic fibers such as cotton, viscose rayon, cellulose rayon, or to mixtures of various fibers with cotton such as cotton polyester fibers, cotton/synthetic fibers, cotton/wool fibers, and the like. Products which can be flame retarded and which are fabricated from the above fibers include synthetic wool coverings; textile fabric wall coverings; lamp shades; automobile upholstery; upholstery for furniture; clothing; apparel accessories, for example, ties, fabric belts, scarfs, etc. draperies; throw pillows; fabric garment bags and luggage; mattress covers and the like.

The following examples will illustrate the present invention. In the examples all temperatures are in degrees centigrade unless otherwise indicated.

EXAMPLE 1

31 g. of yellow phosphorous, 27 g. of methanol, 36 g. of ethylene oxide and 9 g. of N,N-dimethylethanolamine were admixed and allowed to react over a 15 minute period at 88°C. to produce a red molten mixture. To the resulting red molten mixture was added dropwise a mixture of 11 g. of ethylene oxide and 7.0 g. of methanol and to the resulting mixture was added 28 g. of formaldehyde as a 55 percent solution in water and methanol. Evaporation of the reaction mixture to constant weights yielded a light yellow, water-insoluble, viscous liquid containing 21% P.

EXAMPLE 2

201 g. of a colorless viscous liquid produced as in Example 1. was introduced into a mechanically stirred 2 liter, three-necked, round-bottom Pyrex flask containing 120 ml. dry methanol and equipped with nitrogen purge. After the stirred mixture became one phase 800 ml. diethyl ether was introduced slowly over a period of 30 minutes at 25°C. The material became turbid and finally separated into two translucent layers. The upper (ether) phase was transparent after standing overnight. Separation of the upper phase followed by removal of ether under partial vacuum at 60° afforded 12.4 g. of material (ether fraction).

The ether fraction was stirred mechanically in a 250 ml., round-bottom, three necked Pyrex flask equipped with nitrogen purge and reflux-condensor. N,O-bis-trimethylsilylacetamide (14.58 g.) was added over a period of 15 minutes with stirring. After stirring an additional 120 minutes the mixture was one phase.

Vacuum fractional distillation afforded, in addition to acetamide and N,O-bis-trimethylacetamide, four product cuts: (1) 4.18 g. at 56°/0.70 mm, (2) 10.65 g. at 68°/0.17 mm, (3) 1.45 g. at 103°/0.5 mm and (4) 5.35 g. at 88°/0.4 mm (distillation on a very short path at non-equilibrium conditions). Isolation of the two products was accomplished by preparative vapor-liquid chromatography on a 10% W 98 on chromosorb W (M + W) column at a flow rate of 85cc/min. The detector, injection port and exit port were 250°, 250° and 250°C. respectively. Injection was performed on column. The column temperature was programmed at 10°/min. between 80° and 205°. Almost total hydrolysis of the trimethyl silylated derivatives occured at the exit port and the original phosphorous alcohols were isolated individually in dry ice-acetone cooled traps. The trimethysilanol which formed as a result of hydrolysis vaporized out during product collection.

The compounds methyl 2-hydroxyethylmethylphosphinate and methyl 2-hydroxyethylmethylolphosphinate were identified by mass spectral data, $H^2NMR$, $P^{31}NMR$ and infrared spectra.

EXAMPLE 3

303 g. of a colorless viscous liquid produced as in Example 1. was introduced into a mechanically stirred 2 liter, three-necked, round-bottom Pyrex flask containing 75 ml. dry methanol equipped with nitrogen purge. After the stirred mixture became one phase 750 g. dioxane was introduced slowly over a period of 30 minutes at 25°. The material became turbid and finally separated into two translucent layers. The upper (dioxane) phase was transparent after standing overnight. Separation of the upper phase followed by removal of dioxane under partial vacuum below 50° afforded 36.8 g. of residue product (dioxane fraction).

The dioxane fraction was stirred mechanically in a 250 ml., round-bottom, three necked Pyrex flask equipped with nitrogen purge and reflux-condensor. N,O-bis-trimethylsilylacetamide (45 g.) was added over a period of 15 minutes with stirring. After stirring an additional 120 minutes the mixture was one phase.

Vacuum fractional distillation afforded, in addition to acetamide and N,O-bis-trimethylacetamide, four product cuts: (1) 12.91 g. at 56°/0.70 mm, (2) 32.1 g. at 68°/0.17 mm, (3) 4.48 g. at 103°/0.5 mm and (4) 16.19 g. at 88°/0.4 mm (distillation on a very short path at non-equilibrium conditions). Isolation of the two products was accomplished by preparative vapor-liquid chromatography on a 10% w 98 on chromosorb W (M + W) column at a flow rate of 85cc/min. The detector, injection port and exit port were 250°, 250° and 250°C. respectively. Injection was performed on column. The column temperature was programmed at 10°/min. between 80° and 205°. Almost total hydrolysis of the trimethyl silylated derivatives occured at the exit port and the original phosphorous alcohols were isolated individually in dry ice-acetone cooled traps. The trimethylsilanol which formed as a result of hydrolysis vaporized out during product collection.

The compounds Methyl 2-hydroxyethylmethylphosphinate and methyl 2-hydroxyethylmethylolphosphinate were identified by mass spectral data, $H^2NMR$, $P^{31}NMR$ and infrared spectra.

Although certain preferred embodiments of the invention have been disclosed for purposes of illustration, it will be evident that various changes and modifications may be made therein without departing from the scope and spirit of the invention.

I claim:

1. Compounds of the formula:

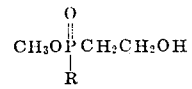

wherein R is methyl or hydroxymethyl.
2. Methyl 2-hydroxyethylmethylphosphinate.
3. Methyl 2-hydroxyethylmethylolphosphinate.
4. Process which comprises the steps of
  a. reacting elemental phosphorus, methanol and ethylene oxide at a temperature of about 25°C. to about 200°C. in the presence of N,N-dimethylethanolamine to produce an organophosphorus composition, and thereafter reacting said organophosphorus composition with formaldehyde in order to convert substantially all of the phosphinous hydrogen to hydroxymethyl;
  b. admixing the product from step (a) with a solvent selected from the group consisting of methanol, ethanol and ethylene glycol, in an amount within the range of 5 to 30 parts per hundred parts of phosphorus reaction product by weight;
  c. adding a solvent selected from the group consisting of diethyl ether, dioxane, glyme, and diglyme to said admixture accompanied with agitation, the amount of solvent of step (c) being 7 to 15 parts by weight based on the weight of the solvent of step (b);
  d. separating a solvent fraction from step (c) above;
  e. adding to said solvent fraction from step (d) above a compound selected from the group consisting of N,O-bis-trimethylsilylacetamide, trimethylsilylimidazole and N,O-bis-trimethylsilyltrifluoroacetamide, to form methyl 2-trimethylsiloxyethylmethylphosphinate and methyl 2-trimethylsiloxyethyltrimethylsiloxymethylphosphinate and thereafter
  f. hydrolyzing and recovering compounds of the formula

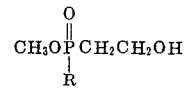

wherein R is methyl or hydroxymethyl.
5. Process according to claim 4 wherein the compound recovered from step (f) is methyl 2-hydroxymethylphosphinate.
6. Process according to claim 4 wherein the compound recovered from step (f) is methyl 2-hydroxyethylmethylolphosphinate.
7. Process according to claim 4 wherein the solvent of step (b) is methanol.
8. Process according to claim 4 wherein the compound of step (e) is N,O-bis-trimethylsilylacetamide.

* * * * *